United States Patent
Derksen (10) Patent No.: US 6,414,839 B1
(45) Date of Patent: Jul. 2, 2002

(54) SHUTTER MECHANISM FOR VERTICAL BUS OF MOTOR CONTROL CENTER

(75) Inventor: James S. Derksen, Wheeling, IL (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 09/676,880

(22) Filed: Sep. 29, 2000

(51) Int. Cl.⁷ .................................................. H02B 1/04
(52) U.S. Cl. ........................ 361/617; 200/50.22; 218/89
(58) Field of Search ........................... 200/50.21, 50.22, 200/304, 305; 218/1–7, 77, 89; 174/67; 439/137–145; 361/605, 607, 609, 611, 615, 617

(56) References Cited

U.S. PATENT DOCUMENTS

| | | | |
|---|---|---|---|
| 2,673,260 A | 3/1954 | Lester et al. .................. 200/50 |
| 3,209,301 A | 9/1965 | Duffy, Jr. ...................... 339/22 |
| 3,213,222 A | 10/1965 | Finley et al. ................. 200/50 |
| 3,896,353 A | 7/1975 | Burton et al. ................ 317/103 |
| 3,920,939 A | * 11/1975 | Ciboldi et al. ........... 200/50.22 |
| 4,038,585 A | 7/1977 | Wolski et al. ............... 361/334 |
| 4,090,230 A | 5/1978 | Fuller et al. ................ 361/345 |
| 4,386,246 A | 5/1983 | Castonguay .................. 200/50 |
| 4,395,602 A | 7/1983 | Castonguay .................. 200/50 |
| 4,443,676 A | * 4/1984 | Castonguay ................. 200/304 |
| 4,447,682 A | * 5/1984 | Castonguay ............. 200/50.22 |
| 4,486,815 A | 12/1984 | Takahashi ..................... 361/345 |
| 4,688,144 A | 8/1987 | Kleinecke et al. ........... 361/345 |
| 5,316,490 A | 5/1994 | Clemence et al. ........... 439/114 |
| 5,343,355 A | 8/1994 | Ishikawa ...................... 361/617 |
| 5,486,978 A | 1/1996 | Fishovitz ...................... 361/617 |
| 5,497,287 A | 3/1996 | Yee et al. ..................... 361/617 |
| 5,505,630 A | 4/1996 | Petrisko et al. .............. 439/137 |
| 5,525,068 A | 6/1996 | Graham et al. .............. 439/114 |
| 5,761,025 A | * 6/1998 | Iversen ......................... 361/617 |
| 6,025,983 A | * 2/2000 | Uchida et al. ............... 361/606 |
| 6,081,419 A | * 6/2000 | Pham ........................... 361/617 |

FOREIGN PATENT DOCUMENTS

SU    0904056 A   * 2/1982   ................. 361/617

\* cited by examiner

Primary Examiner—Gerald Tolin (57) ABSTRACT

A compact automatic shutter mechanism in an electrical enclosure provides enhanced protection against inadvertent electrical contact for personnel working within and around the electrical enclosure, and also makes it possible to install more equipment in the electrical enclosure than could have been accommodated using prior automatic shutter mechanisms.

27 Claims, 5 Drawing Sheets

SHUTTER MECHANISM FOR VERTICAL BUS OF MOTOR CONTROL CENTER

FIELD OF THE INVENTION

My invention is directed to enclosures for electrical equipment, such as motor control centers, and more particularly to a shutter mechanism which automatically closes off access to bus bars used in such enclosures to reduce the risk of inadvertent electrical contact by a technician installing or removing equipment from the enclosure.

BACKGROUND OF THE INVENTION

Protecting people working within or around electrical equipment such as motor control centers against inadvertent electrical contact is a concern for designers of such equipment. A typical motor control center includes an enclosure for mounting and housing three bus bars capable of carrying high current side-by-side in the enclosure with their longitudinal axes running from bottom to top of the enclosure. A mounting panel is typically provided adjacent the bus bars and includes provisions for mounting various electrical devices, such as control units, on a mounting surface of the panel opposite the bus bars. These electrical devices and control units typically include an electrical connector for connecting the device or control unit to one or more of the bus bars. The mounting panel typically includes a connector opening over each bus bar for passage of the connector through the panel and into electrical contact with the bus bar when the electrical device or control unit is mounted on the mounting surface. While the electrical device or control unit is mounted on the mounting panel, the openings over the bus bars are typically covered by the control unit or device in a manner precluding inadvertent contact with the bus bars. Prior to installation of or the removal of the device or control unit, however, the bus bars are exposed through the openings in the mounting panel.

Many prior approaches to protecting against electrical contact have been utilized. In one approach, the bus bars are simply left exposed when an electrical device is not mounted over one or more of the connector openings in the panel, and people are simply given verbal warnings or tags are attached to the enclosure warning people against touching the exposed bus bars. This prior approach is not very satisfactory in that it really does not inhibit physical contact with exposed bus bars.

In other prior electrical enclosures, a device known as a manual shutter has been provided. The shutter typically includes a shutter panel having holes matching those of the mounting panel when the shutter is placed in an open position, so that an electrical device may be installed through the shutter and panel into contact with the bus bars. The shutters typically include one or more web areas between the holes which cover the electrical connector openings in the panel when the shutter is in the closed position. However, bus bars are exposed before the shutter is manually closed, and during any time period when the shutter has been manually opened but the electrical device has not yet been installed.

There have also been many different approaches utilized in the past aimed at providing an automatic shutter mechanism that will close on its own as an electrical device in contact with the bus bars is removed from the enclosure, without any action being taken by a technician or operator and automatically open the shutter as a replacement electrical device is inserted back into the enclosure to make contact with the bus bars. Prior approaches to providing such an automatic shutter mechanism have spanned the range from a very simple shutter operating under the force of gravity via an inclined plane, to shutters which are pushed, pulled, or otherwise forced into an open or closed position respectively upon installation or removal of an electrical device using a shutter actuation system which often includes complex arrangements of cams, levers, chains and sprockets, and the like. Such prior automatic shutter actuation systems have tended to be bulky and complex, and often extend beyond the top and bottom sides of the electrical device, thereby consuming space inside the enclosure which could more advantageously be used to mount additional electrical devices connected to the bus bars.

It is an object of my invention, therefore, to provide an improved electrical enclosure through utilization of an improved shutter mechanism. It is also an object of my invention to provide a shutter mechanism which is straight forward in its construction and operation, and very compact with little or no extension of the shutter mechanism above and below an electrical device with contacts protected by my shutter mechanism.

SUMMARY OF THE INVENTION

My invention meets the above objects by providing an improved shutter actuator including a lever having one end hinged to the shutter and extending outward from the shutter to a distal outer end of the lever configured for engaging a control unit or electrical device having electrical contacts configured to connect with bus bars within the enclosure. My improved actuator further includes a spring mechanism operably attaching the lever to the shutter for urging the distal end of the lever to pivot outward from the shutter while simultaneously urging the shutter toward a first, closed position wherein web portions of the shutter close off access to the bus bars protected by the shutter. As an electrical device is installed, a lever engaging surface of the electrical device contacts the outer end of the lever. As the electrical device is pushed into place, the lever and spring mechanism pull the shutter open to expose the bus bars for electrical connection to the electrical connectors on the electrical device. When the electrical device is removed, the spring mechanism causes the lever to pivot outward from the shutter, thereby allowing the shutter to return to a closed position.

In a preferred embodiment of my invention, a single constant force spring in the form of an extendable, coiled, tape spring is utilized for simultaneously urging the lever to spring outward and the shutter to return to the closed position. This aspect of my invention can be utilized in many different embodiments meeting the needs of a particular electrical enclosure with an elegantly simple actuator having only a few, e.g., two or three parts.

According to another aspect of my invention, an embodiment of an actuator according to my invention does not protrude above or below the top or bottom edges respectively of a control unit or electrical device connected to bus bars in an enclosure.

According to another aspect of my invention, the lever and spring mechanisms of an actuator mechanism are connected to a pusher plate operably connected to the shutter in such a manner that as the lever is pushed inward, by installing a control unit, or pulled outward by the spring, the pusher plate pushes or pulls the shutter from a closed to an open position. In a highly preferred embodiment according to this aspect of my invention, the pusher plate includes key-shaped slots for receipt of a mating key-shaped projection of the shutter. Making the operable connection between the pusher plate and shutter in this manner allows a single pusher plate configuration to be used with shutters of differing thickness or shape, thereby providing the advantage of reducing the inventory of parts which must be carried to manufacture or repair a line of equipment enclosures having different shutter configurations. The slotted shape also allows the pusher plate and shutter to be utilized on panels wherein the shutter and pusher plate are mounted for sliding movement in a different plane.

The compact size, together with simple construction and operation, allow a shutter mechanism according to my invention to be readily retrofitted into existing enclosures which formerly utilized other types of shutter mechanisms. The compact size of my shutter mechanism also makes it possible to install more equipment in the same electrical enclosure due to the fact that my shutter mechanism does not extend above or below the control unit or electrical device mounted through the shutter of my invention.

Other aspects and advantages of my invention will be apparent to those having skill in the art upon review of the attached drawings and the following detailed description.

DETAILED DESCRIPTION OF THE PREFERRED EMBODIMENT

Figure 1:
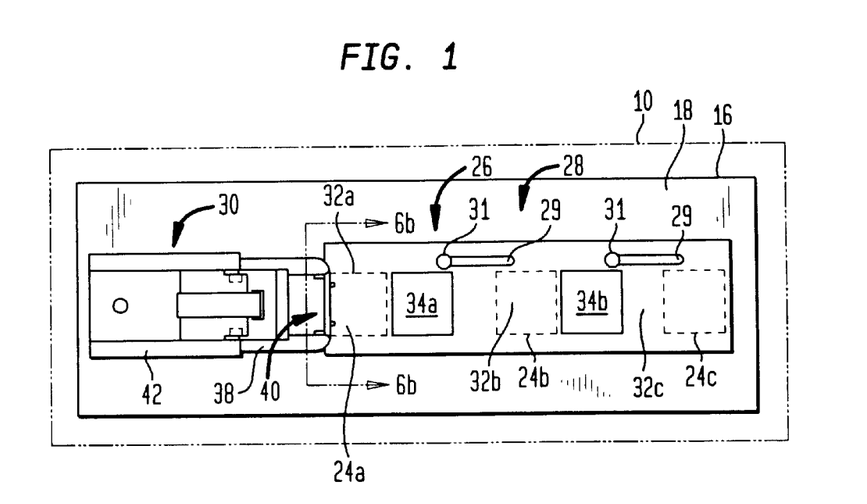
FIG. 1 depicts an exemplary embodiment of my invention with the shutter in the closed position.
Figure 2:
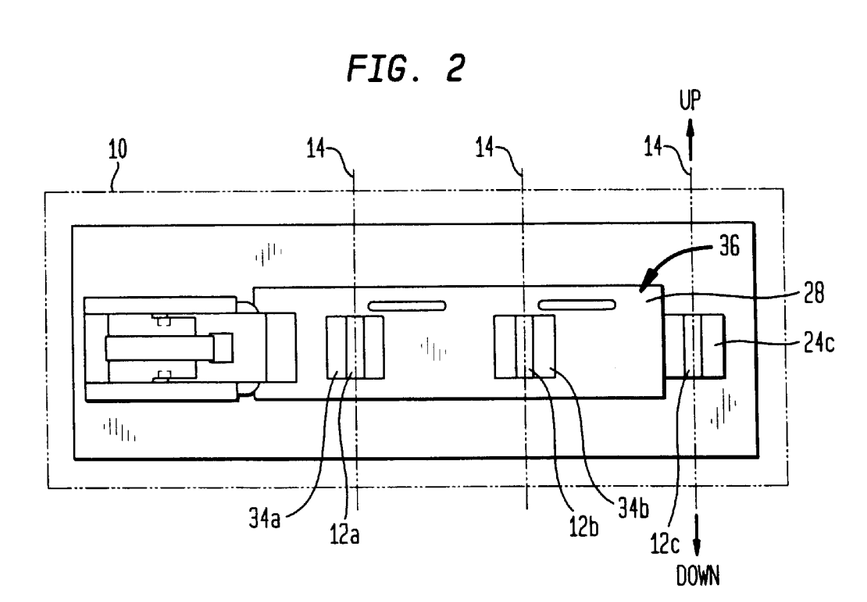
FIG. 2 depicts the exemplary embodiment of FIG. 1 with the shutter in an open position.
Figure 3:
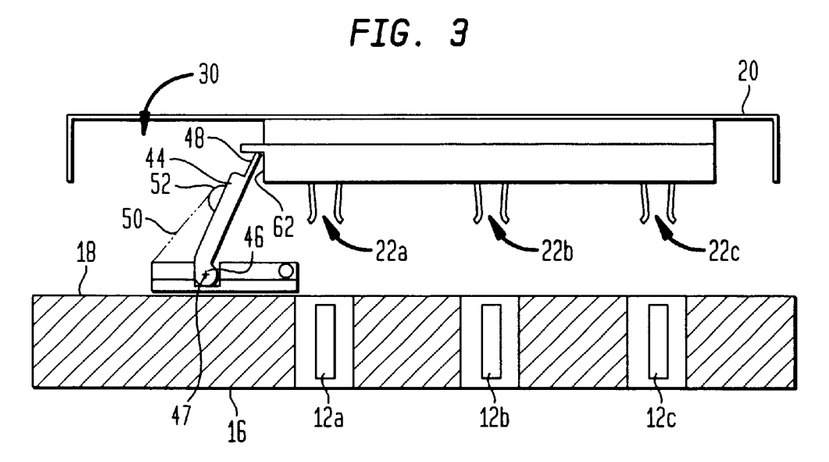
FIG. 3 is a cross-section of the embodiment in FIG. 1 showing a control unit engaging a shutter actuator of my invention, and the shutter in a closed position.
Figure 4:
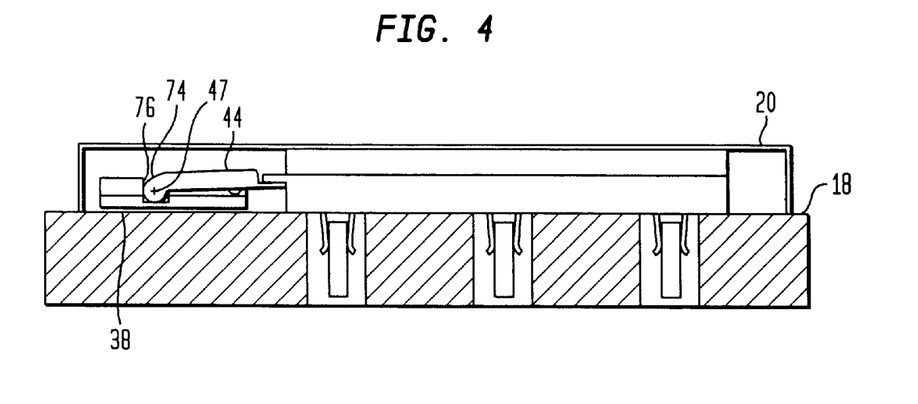
FIG. 4 is a sectional depiction of the control unit installed on an electrical enclosure according to my invention and the shutter in an open position.

FIGS. 1–4 depict an exemplary embodiment of an electrical enclosure according to my invention in the form of a motor control center 10 including three bus bars 12a, 12b, 12c having longitudinal axes 14 mounted in parallel with one another and the longitudinal axes extending in a generally vertical up-down direction as indicated in FIG. 2. The motor control center 10 includes a mounting panel 16 having a control unit mounting surface 18 opposite the bus bars 12a, 12b, 12c for receiving a control unit 20, as shown in FIGS. 3 and 4.

As shown in FIGS. 3 and 4, the control unit 20 includes three stab-on electrical connectors 22a, 22b, 22c for connecting the control unit 20 to the bus bars 12a, 12b, 12c.

As shown in FIG. 1, the mounting panel 16 includes connector openings 24a, 24b, 24c, as indicated by dashed lines, for passage of the electrical connectors 22a, 22b, 22c through the panel 16 and into electrical contact with the bus bars 12a, 12b, 12c when the control unit 20 is mounted on the mounting surface 18, as shown in FIG. 4.

A shutter mechanism 26 includes a shutter panel 28, and a shutter actuator 30. The shutter panel 28 is slidably mounted by elongated slots 29 and fasteners in the form of plastic rivets or retaining bolts 31 on the mounting surface 18 for movement along a path generally transverse to the longitudinal axes 14 between a first or closed position, as shown in FIG. 1, and a second or open position, as shown in FIG. 2. The retaining bolts 31 and slots are configured such that the bolts 31 also function as stops limiting travel of the shutter panel.

The shutter panel 28 includes three webs 32a, 32b, 32c respectively covering the connector openings 24a, 24b, 24c in the mounting panel 16 when the shutter panel 28 is in the closed position as depicted in FIG. 1. The shutter panel 28 also includes two holes 34a, 34b configured to align with the connector openings 24a, 24b in the mounting panel 16 for passage of electrical connectors 22a, 22b of the control unit 20 when the shutter panel 28 is in the second or open position as depicted in FIG. 2. Only two holes 34a, 34b are required in the shutter panel 28 as depicted in FIGS. 1–4 because the length of the shutter panel 28 has been judiciously selected so that when the shutter panel 28 moves right to left from the closed to the open position as seen by comparing FIGS. 1 and 2, the right end 36 of the shutter panel 28, as shown in FIG. 2 clears the hole 24c allowing access to bus bar 12c.

The shutter actuator 30 includes a shutter pusher plate 38 operably connected at arrow 40 by a flexible connection to the left end of the shutter 28 for movement with the shutter 28 along the path generally transverse to the longitudinal axis 14 of the bus bars 12 between the open and closed positions of the shutter 28. The actuator 30 also includes a track 42 mounted on the mounting surface 18 for retaining and guiding the pusher plate 38 along the path as the shutter 28 moves from the open and closed positions.

Figure 5:
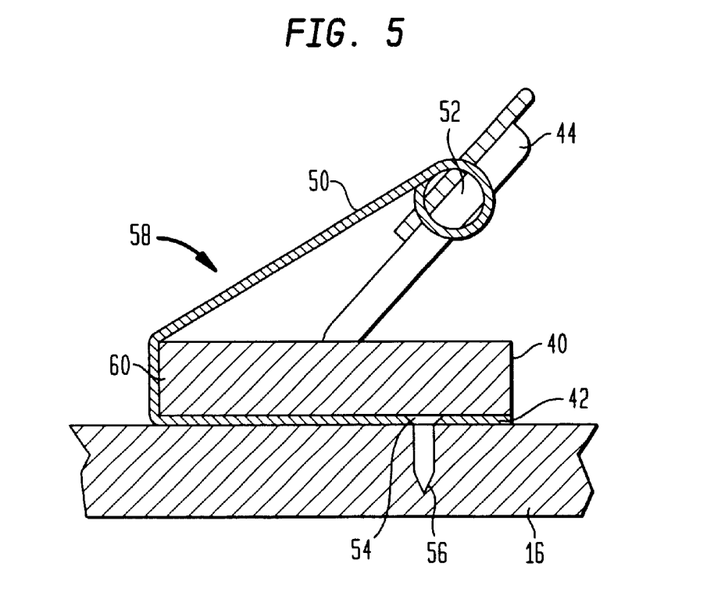
FIG. 5 is an enlarged view of a portion of a shutter actuator according to my invention.

As shown in FIGS. 3 and 4, the actuator 30 includes a lever 44 having one end 46 pivoted by a pivot pin shown schematically at 47 to the pusher plate 38 and extending outward from the pusher plate 38 to a distal end 48 of the lever 44 configured for engaging the control unit 20. As shown in FIG. 5, the shutter actuator 30 further includes a spring mechanism in the form of a constant force spring 50 conventionally including an extendable, coiled, tape spring having a first end 52 thereof attached to the lever 44 at a point on the lever outward from the pivot 47 and a second end 54 attached simultaneously to the track 42 and the mounting panel 16 by a single screw 56, as shown in FIG. 5. A portion 58 of the constant force spring extending between the first and second ends 52, 56 of the spring 50 slidably engages the pusher plate 38 at an end 60 opposite the end 40 of the pusher plate 38 attached to the shutter panel 28. The lever 44 includes a flat 74 configured to bear against a stop surface 76 of the pusher plate 38 to form a stop limiting outward pivoting of the lever 44 to a desired angle less than 90□ from the shutter panel, as shown in FIG. 3, when the shutter panel 28 is in the closed position.

Operation of the embodiment of a shutter mechanism 26 as described thus far, may now be readily seen by examination of FIGS. 1 through 5. Prior to installation of the control unit 20, the constant force spring 50 causes the lever 44 to swing outward and the pusher plate 38 to pull the shutter panel 28 into a closed position as indicated by FIGS. 1 and 5. As the control unit 20 is brought into position for engaging the electrical contacts 22a, 22b, 22c with the bus bars 12a, 12b, 12c, as shown in FIG. 3, the distal end 48 of the lever 44 comes into contact with a surface 62 of the control unit 20 configured to receive the distal end 48 of the lever 44. The surface 62 may be in the form of a V-shaped notch. As the control unit 20 is pushed toward the mounting panel 16 and bus bars 12a, 12b, 12c, the lever 44 is pushed toward the pusher plate as shown in FIG. 4, and the lever 44 pulls the shutter panel 28 from the closed position of FIG. 1 to the open position of FIG. 2, thereby allowing the electrical connectors 22a, 22b, 22c of the control unit 20 to engage the bus bars 12a, 12b, 12c as shown in FIG. 4.

When the control unit is removed, the procedure described above is reversed, and the constant force spring 50 returns the lever 44 to its extended position and simultaneously pulls the shutter and pusher plate back into the closed position indicated in FIG. 1.

Figure 6A:
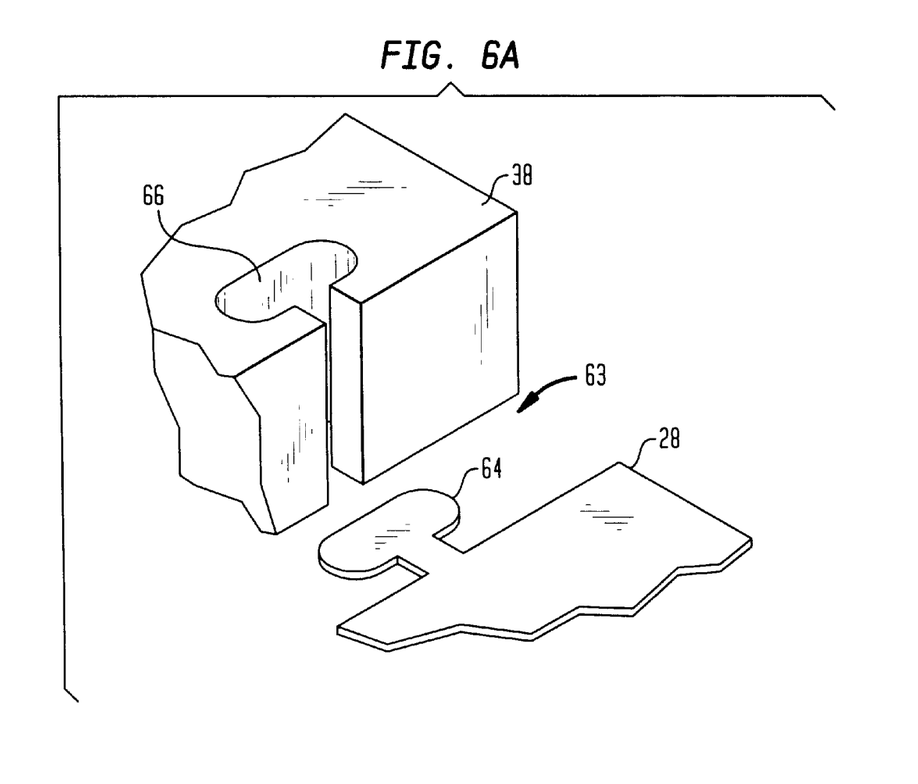
FIG. 6a depicts a keyed, slidable connection between a shutter and a pusher plate according to my invention.
Figure 8:
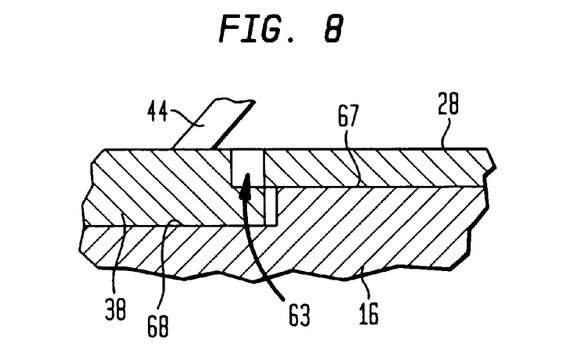
FIG. 8 is a partial sectional view taken along a centerline of FIG. 6a depicting a flexible joint formed by engaging a T-shaped tang with a mating T-shaped slot, to allow shutter mechanisms of varying thicknesses and shapes to be used with a single pusher plate configuration, or alternatively, allowing the shutter mechanism and pusher plate to be mounted on a stepped mounting plate having a first and a second mounting surface not lying in a common plane.

FIG. 6a depicts an exemplary embodiment for making the flexible connection between the pusher plate 38 and shutter panel 28. According to this embodiment of my invention, the pusher plate 38 includes a flexible joint 63 formed by engaging a T-shaped tang 64 of the shutter 28 in a mating T-shaped slot 66 in the pusher plate 38. This arrangement allows shutter mechanisms of varying thicknesses and shapes to be used with a single standard pusher plate 38. Alternatively, the flexible connection 63 formed by the T-shaped tang end slot 64, 66 allows the shutter panel 28 and pusher plate 38 to be mounted on a mounting plate 16 having a first mounting surface 67 and a second mounting surface 68 not lying in a common plane, as shown in FIG. 8, thereby allowing greater flexibility for designing the enclosure. This feature also allows the pusher plate 38 and shutter panel 28 to "float" with respect to one another to accommodate non-uniformity in the mounting panel, and reduce the need for highly toleranced parts.

Figure 6B:
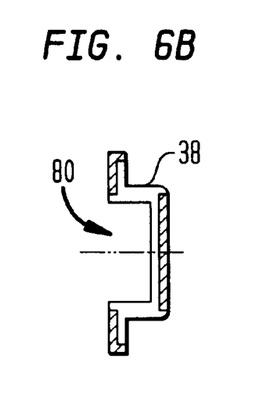
FIGS. 6b–6e depict an alternate embodiment of the connection between the shutter and the pusher plate.
Figure 6C:
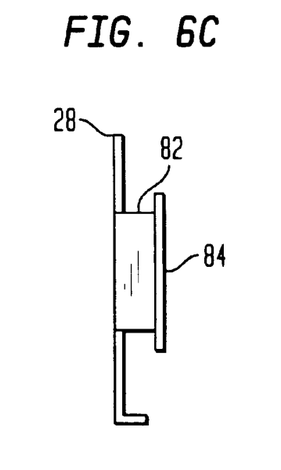
Figure 6D:
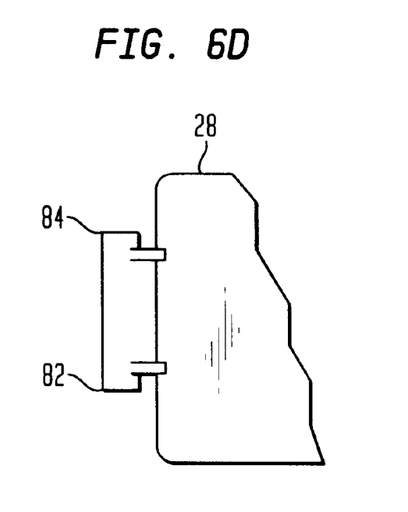
Figure 6E:
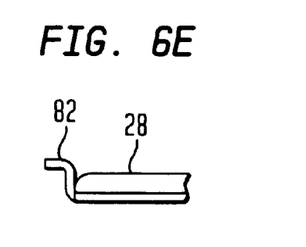

FIGS. 6b–6e depict an alternate embodiment for making the flexible connection between the pusher plate 38 and the shutter panel 28. FIG. 6b is a sectional view of the pusher plate 38 taken along lines 6b—6b in FIG. 1. The pusher plate of the embodiment depicted in FIG. 6b includes a rectangular opening 80 in an end of the pusher plate 38 adjacent the shutter panel 28. As shown in FIGS. 6c–6e, the shutter panel 28 includes a Z-shaped tab 82 extending upward from the remainder of the shutter panel 28 and terminating in a T-shaped bar 84. In this embodiment of my invention, the configuration of the Z-shaped tab 82, T-shaped bar 84 and the dimensions of the rectangular opening 80 in the pusher plate 38 are judiciously selected such that when the T-shaped bar 84 is inserted into the rectangular opening 80 in the pusher plate 38, and both the pusher plate 38 and shutter panel 28 are installed in the motor control center 10, the shutter panel 28 is locked into the pusher plate 38 in such a manner that the pusher plate 38 and shutter panel 28 cannot be separated by merely lifting the shutter panel 28 straight up off of the mounting surface 18. This construction provides an advantage in that any friction or binding in operation of the shutter panel 28 is less likely to cause a separation of the flexible joint. In a highly preferred version of this embodiment of my invention, the dimensions of the Z-shaped tab 82, the T-shaped bar 84 and the rectangular opening 80 in the pusher plate 38 are selected and configured such that the shutter panel 28 may be installed or removed from the motor control center 10 after removal of the screws 31, with the shutter actuator 30 affixed to the mounting surface 18.

Figure 7:
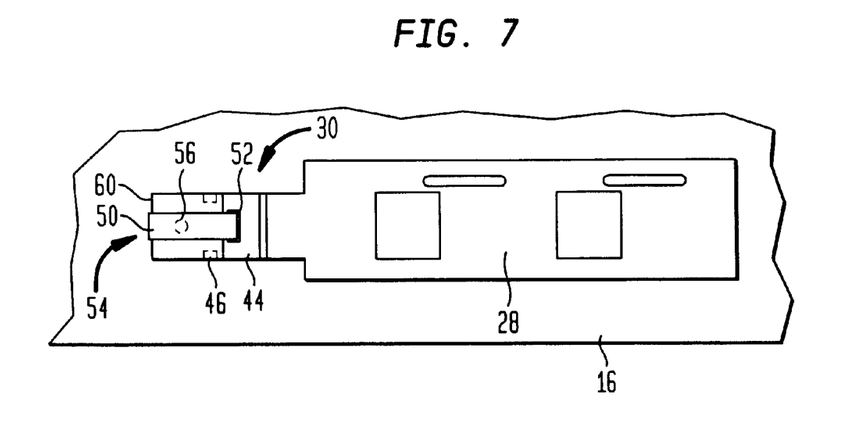
FIG. 7 depicts an embodiment of my invention wherein the shutter actuating mechanism is mounted on the shutter itself, and the pusher plate and associated guide and retaining track are eliminated.

FIG. 7 depicts an alternate embodiment of my invention in which the shutter actuator 30 is mounted on the shutter panel 28, thereby allowing the track 42 of the embodiments described above to be eliminated. In the embodiment of FIG. 7, the shutter actuator includes a lever 44 having one end 46 hinged to the shutter 28 as in the embodiment of FIGS. 1–4. A constant force spring 50 is attached at a first end 52 to the lever 44 and at a second end 54, at a point underneath the shutter panel 28 to the mounting panel 16 with a screw 56. The portion 58 between the first and second ends 52, 54 of the constant force spring 50 slidingly contacts an end 60 of the shutter panel in a manner similar to that described above and shown in FIG. 5, for embodiments of my invention utilizing a pusher plate. Operation of the alternate embodiment of FIG. 7 is essentially identical to that described above for the embodiments depicted in FIGS. 1–5 utilizing a pusher plate 38. This embodiment provides an advantage in that the track 42, pusher plate 38, and the connection 40 between the actuator 30 and shutter panel 28 can be eliminated, thereby further reducing cost, size, and complexity of my shutter mechanism.

Figure 9:
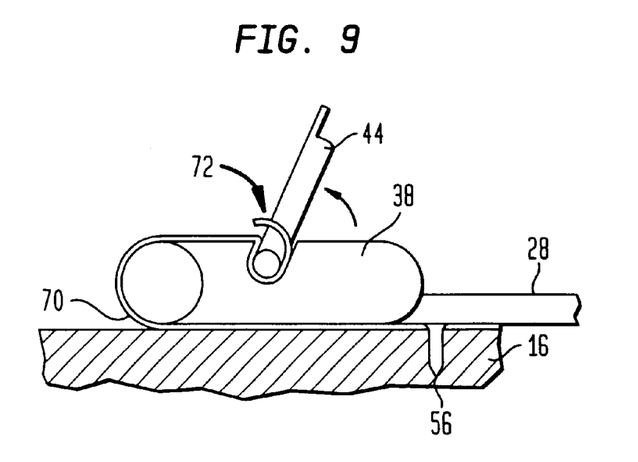
FIG. 9 illustrates an alternate exemplary embodiment of a shutter actuator including a first and a second spring.

FIG. 9 illustrates an exemplary embodiment of my invention in which the spring mechanism includes a first spring in the form of a constant force spring 70 attached at a first end to the pusher plate 38, and attached at a second end to the track or mounting panel 16 by a screw 56 in such a manner that, absent other forces being exerted on the pusher plate, the constant force spring 70 will pull the pusher 38 and shutter 28 into a closed position as indicated at FIG. 1. A second spring in the form of a torsion spring 72 operably connects a lever 44 to the pusher plate 38 for urging the lever 44 to rotate outward from the pusher plate 38, as shown in FIG. 9.

Although I have described certain exemplary embodiments of my invention in the description above and the attached drawings, those having skill in the art will recognize that many other alternate embodiments of my invention are possible and contemplated by me within the scope of the appended claims.

I claim:

1. In a motor control center including a bus bar having a longitudinal axis and a mounting panel adjacent said bus bar, said mounting panel having a control unit mounting surface opposite said bus bar for receiving a control unit having an electrical connector for connecting said control unit to said bus bar, said mounting panel also including a connector opening for passage of said connector through said mounting panel and into electrical contact with said bus bar when said control unit is mounted on said mounting surface, a shutter mechanism comprising:

(a) a shutter panel slidably mounted on said mounting surface for movement along a path generally transverse to said longitudinal axis between a first and a second position of said shutter panel, said shutter panel having a web covering said connector opening in said shutter panel when said shutter panel is in said first position to thereby prevent contact with said bus bar through said connector opening, said shutter panel also having a hole aligning with said connector opening for passage of said electrical connector when said shutter panel is in said second position;

(b) a shutter actuator including a shutter pusher plate operably connected to said shutter panel for movement with the shutter panel along said path, said actuator also including a track mounted on said mounting surface for retaining and guiding said pusher plate along said path as said shutter panel moves between said first and second positions, said shutter actuator further including a lever having one end hinged to said pusher plate and extending outward from said pusher plate to a distal end of said lever configured for engaging said control unit, said shutter actuator further including a spring mechanism operably attaching said lever to said pusher plate and track for urging the distal end of said lever to pivot outward from said pusher plate while simultaneously urging said pusher plate to move said shutter panel into said first position; and (c) a flexible joint operably connecting said pusher plate and shutter panel, wherein said flexible joint operably connects said pusher plate and shutter panel on a panel having a second mounting surface not in a common plane with said control unit mounting surface, and wherein said shutter panel is mounted on one of said control unit mounting surface or said second mounting surface, and said pusher plate is mounted on the other of said control unit mounting surface and second mounting surface.

2. The motor control center of claim 1 including a stop for limiting said outward pivoting of said lever to an angle less than ninety degrees from said pusher plate measured form end of pusher plate attached to said shutter panel.

3. The motor control center of claim 1 wherein said spring mechanism is a constant force spring.

4. The motor control center of claim 1 wherein said constant force spring is an extendable coiled tape spring having a first end thereof attached to said lever at a point on said lever outward from said hinged end and a second end thereof attached to said track, a portion of said constant force spring between said first and second ends thereof engaging and acting against said pusher plate at an end of said pusher plate opposite the end of said pusher plate attached to said shutter panel.

5. The motor control center of claim 1 wherein said spring mechanism includes a first and a second spring, said first spring operably attached between said track and said pusher plate for urging said shutter panel into said first position, said second spring operably attached to said lever and said pusher plate for urging said lever to rotate outward from said pusher plate.

6. The motor control center of claim 1 further including a control unit having a lever engaging surface for engaging said distal end of said lever.

7. The motor control center of claim 1 wherein said flexible joint includes a slotted attachment for operably connecting said pusher plate to said shutter panel in a manner allowing said pusher plate and shutter panel to move along said path.

8. The motor control center of claim 7 wherein said slotted attachment includes a slot in said pusher plate, said slot oriented generally transverse to said control unit mounting surface or second mounting surface, and a tab attached to said shutter, said tab configured to slidably engage said slot.

9. The motor control center of claim 4 wherein a single fastener is utilized to secure said track to said motor control mounting surface and said second end of said spring to said mounting surface.

10. The motor control center of claim 9 wherein said single fastener is a screw passing through said track and said second end of said spring.

11. The motor control center of claim 1 wherein said pusher plate is an integral part of said shutter panel.

12. A shutter mechanism for selectively covering an opening in a structure upon which said shutter mechanism is mounted, said structure configured for receipt of a mounted unit, said shutter mechanism comprising:

(a) a shutter panel slidably mounted on said structure for movement along a path between a first and a second position of said shutter panel, said shutter panel having a web covering said opening in said structure when said shutter panel is in said first position to thereby close said opening when said shutter panel is in said first position, said shutter panel also having a hole aligning with said opening when said shutter panel is in said second position;

(b) a shutter actuator including a lever having one end hinged to said shutter panel extending outward from said shutter panel to a distal end of said lever configured for engaging said mounted unit, said actuator further including a spring mechanism operably attaching said lever to said shutter for urging the distal end of said lever to pivot outward from said pusher plate while simultaneously urging said shutter panel toward said first position;

(c) a stop for limiting said outward pivoting of said lever to an angle less than ninety degrees from said shutter panel; and (d) a flexible joint operably connecting said pusher plate and shutter panel, wherein said flexible joint operably connects said pusher plate and shutter panel on a panel having a second mounting surface not in a common plane with said control unit mounting surface, and wherein said shutter panel is mounted on one of said control unit mounting surface or said second mounting surface, and said pusher plate is mounted on the other of said control unit mounting surface and second mounting surface.

13. The shutter mechanism of claim 12 wherein said spring mechanism includes a constant force spring.

14. The shutter mechanism of claim 13 wherein said constant force spring is an extendable coiled tape spring having a first end thereof attached to said lever at a point on said lever outward from said hinged end and a second end thereof attached to said shutter panel, a portion of said constant force spring between said first and second ends thereof engaging and acting against said shutter panel.

15. The shutter mechanism of claim 12 wherein said spring mechanism includes a first and a second spring, said first spring operably attached between said mounting panel and said shutter for urging said shutter panel into said first position, said second spring operably attached to said lever and said shutter panel for urging said lever to rotate outward from said shutter panel.

16. The shutter mechanism of claim 12 wherein said shutter actuator further includes a shutter pusher plate operably connected to said shutter for movement with the shutter along said path, said actuator also including a track for guiding and retaining said pusher plate along said path as said shutter moves between said first and second positions.

17. The shutter mechanism of claim 12 wherein said spring mechanism includes a first and a second spring, said first spring operably attached between said track and said pusher plate for urging said shutter panel into said first position, said second spring operably attached to said lever and said pusher plate for urging said lever to rotate outward from said pusher plate.

18. The shutter mechanism of claim 12 wherein said flexible joint includes a slotted attachment for operably connecting said pusher plate to said shutter panel in a manner allowing said pusher plate and shutter panel to move along said path.

19. The shutter mechanism of claim 18 wherein said slotted attachment includes a slot in said pusher plate, said slot oriented generally transverse to said structure, and a tab attached to said shutter panel, said tab configured to slidably engage said slot.

20. A shutter mechanism for selectively covering an opening in a structure upon which said shutter mechanism is mounted, said structure configured for receipt of a mounted unit, said shutter mechanism comprising:

(a) a shutter panel slidably mounted on said structure for movement along a path between a first and a second position of said shutter panel, said shutter panel having a web covering said opening in said structure when said shutter panel is in said first position to thereby close said opening when said shutter panel is in said first position, said shutter panel also having a hole aligning with said opening when said shutter panel is in said second position;

(b) a shutter actuator including a lever having one end hinged to said shutter panel extending outward from said shutter panel to a distal end of said lever configured for engaging said mounted unit, said actuator further including a spring mechanism operably attaching said lever to said shutter panel for urging the distal end of said lever to pivot outward from said pusher plate while simultaneously urging said shutter panel toward said first position, the shutter actuator further including a shutter pusher plate operably connected to said shutter panel for movement with the shutter panel along said path, said actuator also including a track for guiding and retaining said pusher plate along said path as said shutter panel moves between said first and second positions; and (c) a single fastener is utilized to secure said track to said motor control mounting surface and said second end of said spring to said mounting surface.

21. The shutter mechanism of claim 16 wherein said pusher plate is an integral part of said shutter mechanism.

22. The shutter mechanism of claim 16 including a stop for limiting said outward pivoting of said lever to an angle less than ninety degrees from said pusher plate measured from the end of pusher plate attached to said shutter panel.

23. The shutter mechanism of claim 20 wherein said spring mechanism is a constant force spring.

24. The shutter mechanism of claim 23 wherein said constant force spring is an extendable coiled tape spring having a first end thereof attached to said lever at a point on said lever outward from said hinged end and a second end thereof attached to said structure, a portion of said spring between said first and second ends thereof engaging and acting against said pusher plate at an end of said pusher plate opposite the end of said pusher plate attached to said shutter panel.

25. The shutter mechanism of claim 20 wherein said single fastener is a screw passing through said track and said second end of said spring.

26. The shutter mechanism of claim 20 including a stop for limiting said outward pivoting of said lever to an angle less than ninety degrees from said shutter panel.

27. The shutter mechanism of claim 20 wherein said spring mechanism includes a constant force spring.

* * * * *